Dec. 24, 1968   J. L. MITCHELL   3,417,471
DENTAL PARALLELOMETER AND METHOD OF USING SAME
Filed Oct. 22, 1965
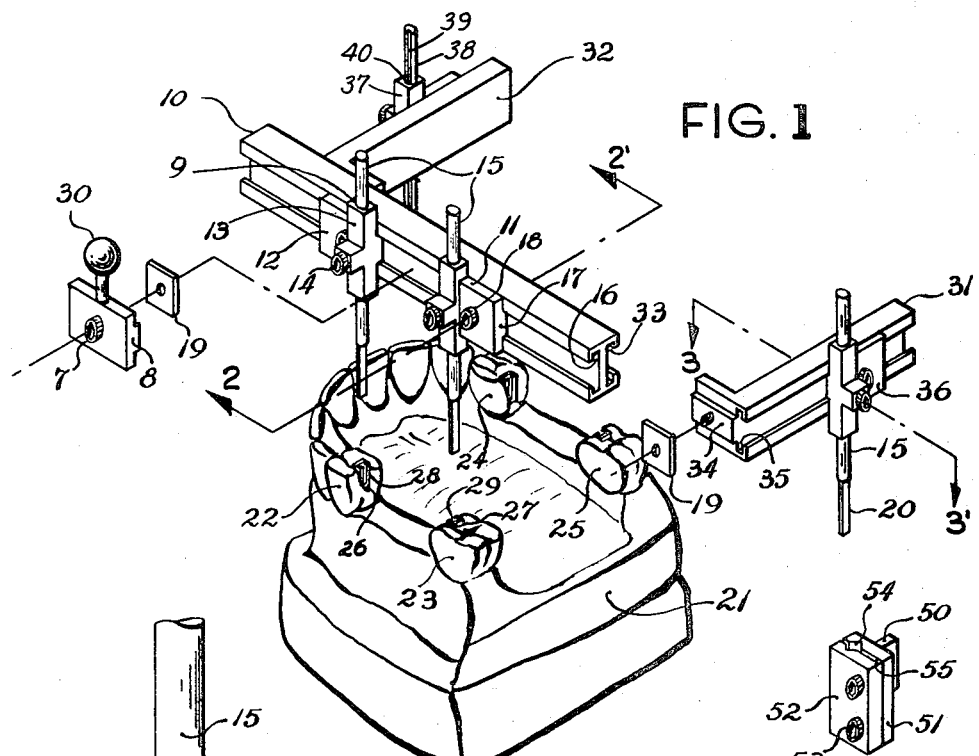
FIG. 1
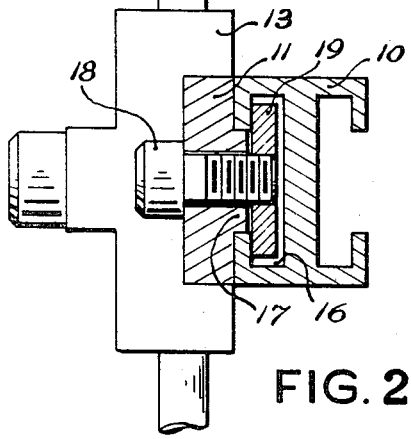
FIG. 2
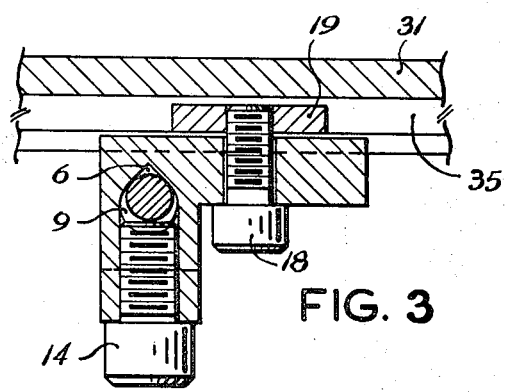
FIG. 5
FIG. 3
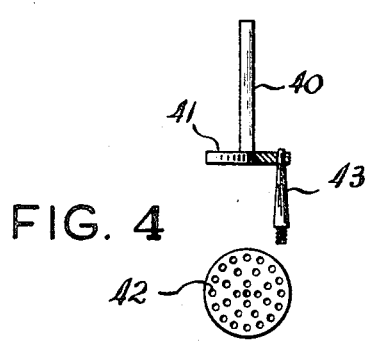
FIG. 4
INVENTOR
JAMES LUTHER MITCHELL
BY Robert E. Shaw
ATTORNEY United States Patent Office
3,417,471
Patented Dec. 24, 1968

3,417,471
DENTAL PARALLELOMETER AND METHOD
OF USING SAME
James Luther Mitchell, 6400 Stanton,
Buena Park, Calif. 90620
Filed Oct. 22, 1965, Ser. No. 501,441
10 Claims. (Cl. 32—67)

ABSTRACT OF THE DISCLOSURE

A dental parallelometer is provided for the precise and parallel alignment of abutment connectors for precision fitting dental attachments. The parallelometer has mandrels that support the connectors during the positioning of these connectors in the dental work. The mandrels are maintained in precise parallel relationships by their mounting on the parallelometer which permits only the sliding, rectilinear movement of the mandrels along the lateral, longitudinal and vertical axis. The parallelometer comprises a first rail and at least one auxiliary rail that is slidably mounted onto the first rail with at least one mandrel support slidably mounted on each of the main or first rail and on the auxiliary rail.

Description of the invention

This invention relates to a method for preparing precision fitting dental attachments and in particular relates to a method and device for the fabrication of such attachments with the abutment couplers in precise parallel disposition.

Precision dental attachments provide secure mounting for dental work such as bridges, partials, etc. by securing two or more connectors to abutment teeth in the mouth which are engaged by mating connectors that are permanently affixed to the dental work. Generally a sliding connection is provided with mating connectors which engage in a sliding relationship so that the entire dental work can readily be removed from the mouth when desired. Essential to a proper fitting of the dental work is the necessity that the mating connectors be in precisely parallel disposition to each other so that the work can be slid into and out of connection without interference.

Heretofore, attempts have been made to align the connectors in the mouth without notable success. Presently, impressions are taken of the cut teeth, models are prepared in the laboratory from the impressions and the connectors are temporarily fastened to the abutment teeth of the model. The model of the dental work is then fabricated by casting the mating connector in the work. The position of the dental model connectors is obtained from the abutment connectors by sliding the mating connectors into the abutment connectors which have been temporarily fastened to the model teeth. The entire model of the dental work is then removed from the model of the patient's teeth by unfastening the temporary joint of the abutment connector to the abutment teeth. In this fabrication, it is essential that the mating surfaces of the abutment connectors be precisely in parallel disposition to avoid misalignment of the connectors which are cast in the dental work. To secure this parallel disposition one technique employs a movable table to which the model can be secured and locked at a suitable inclination. A stand is then used to place the first abutment connector and the table is moved, without changing its angular position to the stand, to place the remaining abutment teeth below the stand and thereby install the remaining abutment connectors.

The aforementioned techniques are not well suited for use because of the difficulty in precisely orienting the connector mandrel into a precisely parallel position. In particular, any looseness of fit or non-parallel alignment of the abutment connectors causes difficulty in the final fit and also create problems in the fabrication of the dental work. A wax cement is generally used to temporarily bond the abutment connectors to the teeth and this bond is often broken or the connector deflected when the connectors are separately placed in the abutment grooves.

It is an object of this invention to provide a method for the facile and precise alignment of connectors for precision fitting dental work.

It is also an object of this invention to provide a simple mechanical device to align such connectors in precisely parallel disposition.

Other and related objects will be apparent from the following description of the invention.

The mechanical device of the invention is illustrated in FIGURE 1 and detailed portions thereof are shown in FIGURES 2 and 3. FIGURES 4 and 5 illustrate alternate elements.

FIGURE 1 illustrates the device of my invention comprising a rail 10 having at least two blocks 11 and 12 slidably mounted thereon, each of the blocks having clamp means which are shown as upright guides 13 and screws 14 to lock mandrels 15 at a desired height in bores 9. Index and guide means on the rail and block are shown in the form of a longitudinal groove 16 in rail 10 and a fitting key 17. This index and guide means insure that the mandrels and rail are maintained orthogonal and, hence, that the mandrels are in parallel disposition. Means to lock the blocks at any position along the rail is provided; see screw 18 in block 11 which engages a block such as 19 shown to the right of FIGURE 1.

Mandrels 15 are provided with lower ends which mate with one of the members of each pair of connectors. As shown, the mandrels have a tip 20 with rectangular cross-section of the same dimensions as the male member of the pair of connectors.

The construction of the mandrel blocks can be seen in FIGURES 2 and 3. Each block has a key 17 which is slidable in groove 16. A block such as 19 is mounted opposite key 17 to engage track 16 and is secured to 11 with machine screw 18 that engages a threaded bore in the block 19. A similar block and machine screw are also shown in a cross-sectional view in FIGURE 3 which also illustrates side rail 31. When this screw is tightened, the block 19 compresses against the inside walls of the groove 16 and precisely locks the block orthogonally to rail 10.

The mandrels 15 are slidable in upright bores 9 which are cut with a V-groove at 16 to provide for centering of mandrels having varied diameters. A machine screw 14 extends through the bore 9 in a threaded top to lock the mandrel in bore 9. An alternative means to center the mandrels is shown with the mandrel mounted on block 37. In this construction, mandrel 38 has a longitudinal groove 39 which mates with a key 40 on the wall of the bore through block 37.

The model of the teeth 21 which is cast from plaster or other suitable plastic material in a plastic impression of the patient's teeth is shown beneath the parallelometer of my invention. This model illustrates a missing molar and cuspid on each side which are to be replaced with precision fitting bridges that will be supported by abutment teeth 22 and 23 on the left side and similar teeth 24 and 25 on the right side. The dentist cuts upright groves in the abutment teeth such as groves 26 and 27 which are approximately parallel to each other and the impression is made of the cut teeth. Model 21 has these grooves and my parallelometer is used to align and temporarily fasten the abutment connectors such as slotted boxes 28 and 29 in the grooves of the abutment teeth.

To place boxes 28 and 29 in groves 26 and 27, the boxes are slid onto the tips 20 and the mandrels are moved into alignment with the grooves. A rail support 30 can also be mounted with a sliding block 8 identical in construction to blocks 11 and 12 with machine screw 7 that engages a clamp block similar to 19 within the rail groove 16. Support 30 provides means for securing the assembly to a support clamp that can be affixed to a stand, etc., thereby freeing both hands to guide the mandrel blocks into position. Once the boxes have been aligned in the grooves, wax or other temporary cement is poured around the boxed to harden and secure them to the grooves. The entire device is then removed from the model by withdrawing the mandrels from the boxes.

FIGURE 1 also illustrates the parallelometer with auxiliary rails 31 and 32. This is a preferred embodiment which permits the simultaneous placement of at least four abutment connectors. As illustrated, these are to be placed in grooves in teeth 24 and 25 for a bridge. The main rail 10 has a double track, i.e., track 16 and an identical dovetailed track 33 on the opposite side. The auxiliary rails have index key means shown at 34 which are identical to the dovetailed index key 17 of mandrel blocks 11 and 12. The auxiliary rail 31 to the right is shown removed from the main rail to illustrate the lock block 19 that is compressed against the inside wall of groove 33 to lock the position of the auxiliary rail to main rail 10.

The auxiliary rails each have index means such as groove 35 which provide a sliding guide for additional mandrel blocks such as 36 which are identical and, hence, interchange with blocks 11 and 12. In this manner, up to four or more abutment connectors can be simultaneously aligned with my parallelometer.

From the preceding description it is apparent that my parallelometer permits the simultaneous placement of a plurality of dental work connectors in precisely parallel alignment. This placement is performed by the method of my invention exteriorly of the mouth on a model of the patient's teeth which is cast from impressions made from the teeth after the abutment teeth have been grooved for the connectors.

The parallelometer of my invention provides complete adjustability for placement of the abutment connectors, yet insures the precise parallel alignment by the mounting of the connector mandrels on blocks which have index and guide means that provide rectilinear amount of the mandrel blocks along a rigid rail. In this manner, the maximum rigidity and strength of the rail is maintained.

The parallelometer can also be used to align dowel pins used to provide sockets in dental models for removable mounting of wax patterns of teeth. FIGURE 4 illustrates a dowel pin holder that can be inserted in place of mandrels 15 in the upright blocks 13. Each holder comprises a shaft 40 with plate 41 secured thereto having a plurality of tapered holes 42 into which the dowel pins 43 can be inserted. The holes 42 are of varied diameters to accommodate the various sized dowel pins that are commonly used. The instrument is used to position these pins above the impression and a thin layer of plaster is poured into the impression and around the dowels. After hardening, the pins are removed to provide a tapered socket in the cast plaster model into which individual wax dies of the teeth can be inserted. The parallelometer can also be used by a dentist to check the grooves cut into teeth in preparation of the teeth to insure that these are in parallel position.

While the specific form of the index and track means is shown as a longitudinal groove, it is apparent that other shaped rails and blocks and other equivalent guide means can be used. One alternative construction for the mandrel clamp means is shown as FIGURE 5. This embodiment uses a split block formed from plate 51 attached to sliding block 55 similar in construction to blocks 11 and 12 with cover plate 52 that is attached to plate 51 by machine screws 53. Mandrel grooves 54 are cut in the plates as shown and a longitudinal shoulder 55 can be provided to insure compression of the grooves in the plates about various diameter mandrels which can be mounted in the mandrel clamp.

It is therefore not intended that my invention be limited to the specifically illustrated device or method. Instead, it is intended that the invention be defined by the elements and their equivalents of the following apparatus claims and the steps and their equivalents of the following method claims:

I claim:

1. A device for paralleling precision attachments in dental models that comprises a first rail, at least one auxilary rail mounted thereon with single axis, rectilinear sliding adjustability, index and guide means to maintain said auxiliary rail orthogonal to said first rail and auxiliary rail lock means to secure said auxiliary rail to said first rail, at least one block mounted on each of said first and auxiliary rails in single axis, sliding rectilinear relationship to its rail, each of said blocks having mandrel support means with mandrel clamp means to lock a mandrel thereon, a mandrel in each of said blocks in single axis, sliding rectilinear relationship, and block index and guide means on said blocks and rails to maintain said mandrels orthogonal to said rails and thereby in parallel alignment to each other and block lock means on said blocks to lock said blocks to said rails.

2. The device of claim 1 each of said mandrels having a lower end that mates with precision fit dental connectors.

3. The device of claim 1 wherein at least one mandrel has a longitudinal groove and its mating block has a matching key that engages said groove.

4. The device of claim 3 including a rail support secured to one of said first and auxiliary rails to provide an attachment for holding said device.

5. The device of claim 1 wherein said rails index and guide means and said block index and guide means are interchangable.

6. The device of claim 1 wherein said mandrel clamp means and said block lock means are independently adjustable.

7. The device of claim 1 wherein said mandrels are mounted in bores in said blocks with each of said bores having a longitudinal V-groove along its inner face to provide a centering seat for a mandrel with means to clamp said mandrel in said seats.

8. The device of claim 1 wherein said first rail has guide means on each side thereof for engagement by said index means.

9. The device of claim 1 wherein said guide means comprises a longitudinal groove along said rails and said index means comprises a key that engages said groove.

10. The device of claim 1 in combination with a second auxiliary rail mounted on said first rail with single axis, sliding rectilinear adjustability.

References Cited

UNITED STATES PATENTS

| | | | |
|---|---|---|---|
| 655,933 | 8/1900 | Le Cron | 33—174 |
| 342,211 | 5/1886 | Lewis et al. | 95—46 X |
| 1,136,100 | 4/1915 | Chayes | 32—67 |
| 1,216,596 | 2/1917 | Nishi | 32—67 |
| 1,227,687 | 5/1917 | Stoll | 32—67 |

(Other references on following page)

| UNITED STATES PATENTS | | | |
|---|---|---|---|
| 1,295,373 | 2/1919 | Riddell | 95—46 |
| 1,526,129 | 2/1925 | Fortunati | 32—5 |
| 2,411,001 | 11/1946 | Rothkranz | 32—5 |
| 2,836,849 | 6/1958 | Humphrey | 32—67 X |
| 3,271,858 | 9/1966 | Simmons | 32—67 X |

FOREIGN PATENTS 494,249  3/1954  Italy.

LOUIS G. MANCENE, *Primary Examiner.*

S. NATTER, *Assistant Examiner.*